United States Patent [19]

Goldberg

[11] Patent Number: 5,794,672
[45] Date of Patent: Aug. 18, 1998

[54] FLORAL ARRANGEMENT WATERING FUNNEL

[76] Inventor: Laurence Goldberg, 7014 Plymouth Rd., Baltimore, Md. 21208

[21] Appl. No.: 690,834

[22] Filed: Aug. 1, 1996

[51] Int. Cl.$^6$ .............................. B65B 39/00; B67C 11/04
[52] U.S. Cl. ............................................ 141/331; D7/700
[58] Field of Search ............................ 141/331–345; 222/460, 461; D7/700; 73/294; 232/43; 248/94; 47/39, 66.2, 75, 79, 80–83; 99/544; 30/113.1, 113.2, 113.3

[56] References Cited

U.S. PATENT DOCUMENTS

| | | | |
|---|---|---|---|
| 170,888 | 12/1875 | Noble | 141/331 |
| 918,355 | 4/1909 | McGowan | 141/341 |
| 1,612,383 | 12/1926 | Lepeshkin | D7/700 |
| 2,337,292 | 12/1943 | Champion | 141/341 |
| 3,648,661 | 3/1972 | Moore | 119/51 |
| 4,335,730 | 6/1982 | Griffin | 141/331 |
| 4,784,184 | 11/1988 | Gates | 141/337 |
| 4,856,568 | 8/1989 | Murphy et al. | 141/340 |
| 5,078,189 | 1/1992 | Ronsonet | 141/392 |
| 5,445,196 | 8/1995 | Tyree, Jr. | 141/297 |
| 5,511,595 | 4/1996 | Stidham | 141/331 |
| 5,517,893 | 5/1996 | Carvino | 86/31 |

*Primary Examiner*—Henry J. Recla
*Assistant Examiner*—Timothy L. Maust
*Attorney, Agent, or Firm*—Nikaido, Marmelstein, Murray & Oram LLP

[57] ABSTRACT

A device for watering flower arrangements of cut flowers inserted into a block of closed cell foam comprising a conically shaped funnel having a central axis, an upper end and a lower end with the lower end being cut at an acute angle to the central axis. The upper end can have a flanged lip which can be radially outwardly directed relative to the central axis. The upper half of the funnel can be scalloped, generally circular in plan and symmetrically arranged around the central axis with the scallops being evenly spaced about a periphery of the funnel. The upper end can have a pair of slits arranged in parallel with the central axis and spaced apart from each other such that a card can be inserted into and held by the slits. The funnel is made to hold a predetermined volume of water.

18 Claims, 2 Drawing Sheets

FLORAL ARRANGEMENT WATERING FUNNEL

BACKGROUND OF THE INVENTION

The present invention relates to a device for watering flower arrangements, particularly, arrangements of cut flowers inserted into a block of closed cell foam.

In preparing flower arrangements, a closed cell foam brick or block is used to both hold the stems of the flowers and to hold and feed water to the stems. The brick or block of foam is set in a plastic liner in a basket or other container and the stems are artfully stuck into it. One brand of a suitable closed cell foam is known as "Oasis" by The Oasis Co.

A difficulty arises in directing the water into the flowers after the arrangement is prepared without spilling water into areas not intended. Either a long neck watering can is used, which can be difficult to judge the correct amount of water to add and care must be taken to avoid having the water splash or pour out the opposite side of the arrangement or the entire arrangement with basket must be carried to the sink and watered there, with the potential problems of overflow and getting the outer basket wet. If the flowers are not watered regularly, they very quickly die. The flowers must be regularly watered in order to survive to their maximum lifespan.

Additionally, to indicate from whom the flowers are coming, florists use "cardettes", trident shaped plastic rods with a barbed lower end and a forked upper end to hold the card from the donor. This requires a separate piece of structure.

OBJECT AND SUMMARY OF THE INVENTION

It is an object of the present invention to provide a device for watering flower arrangements, particularly, arrangements of cut flowers inserted into a block of closed cell foam which avoids the problems described above.

The present invention is a device for watering flower arrangements of cut flowers inserted into a block of closed cell foam comprising a conically shaped funnel having a central axis, an upper end and a lower end with the lower end being cut at an acute angle to the central axis. The upper end can have a flanged lip which can be radially outwardly directed relative to the central axis. The upper half of the funnel can be scalloped, generally circular in plan and symmetrically arranged around the central axis with the scallops being evenly spaced about a periphery of the funnel. The upper end can have a pair of slits arranged in parallel with the central axis and spaced apart from each other such that a card can be inserted into and held by the slits.

The funnel is made to hold a predetermined volume of water. The predetermined volume of water can be in the range of from ½ to 1½ cups. The funnel can have a length in a range of from 6 to 10 inches, an upper end diameter in a range of from 1 to 3 inches, and a lower end diameter in a range of from ½ to ⅛ inches. The funnel can be made of polypropylene. The polypropylene can be at least substantially transparent whereby when the funnel is positioned in the midst of a floral arrangement, the funnel is substantially invisible. In order to provide the functional benefits described herein, the polypropylene does not have to be transparent.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EMBODIMENT

Figure 1:
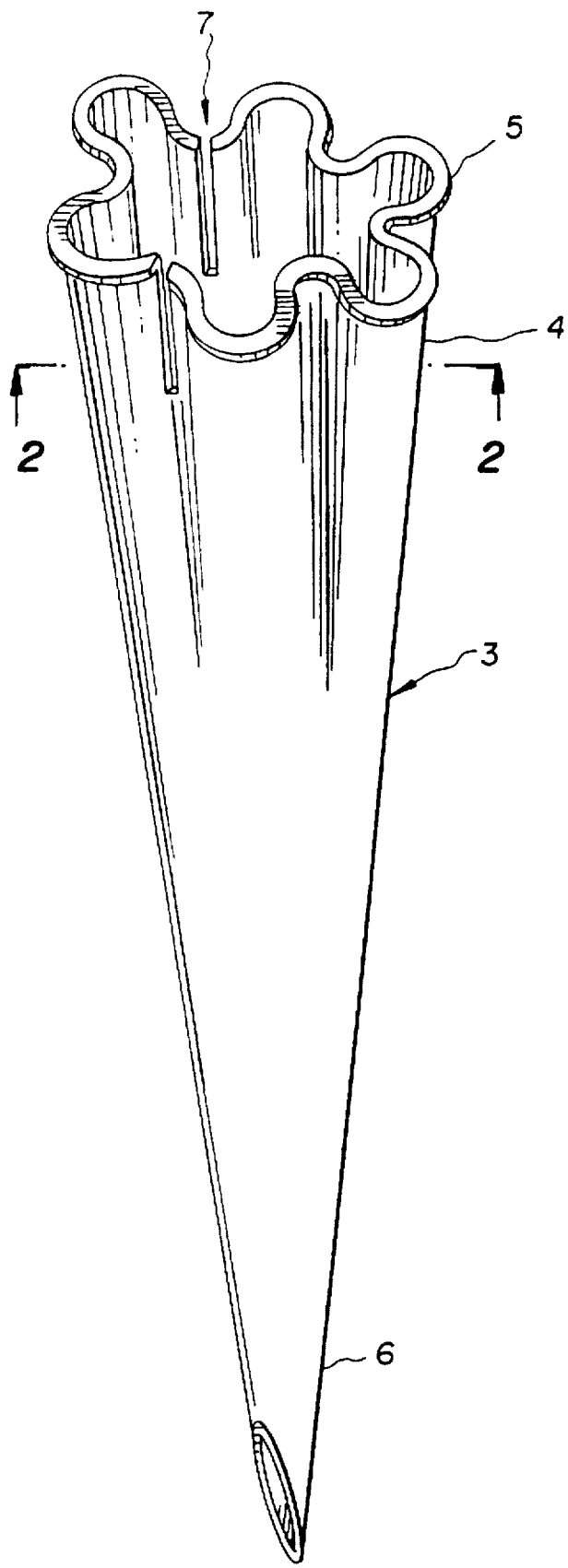
FIG. 1 is a perspective view of an embodiment of the present invention.
Figure 2:
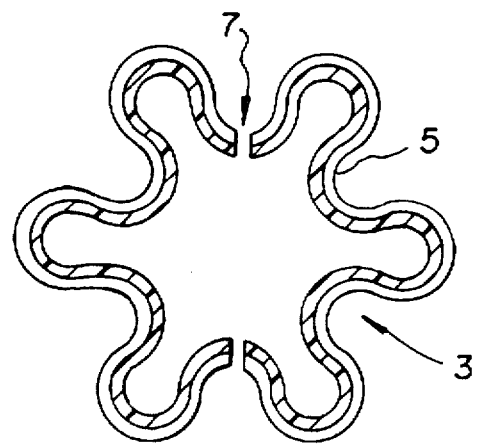
FIG. 2 is a cross-sectional view taken along lines 2—2 of FIG. 1 looking upwardly.
Figure 3:
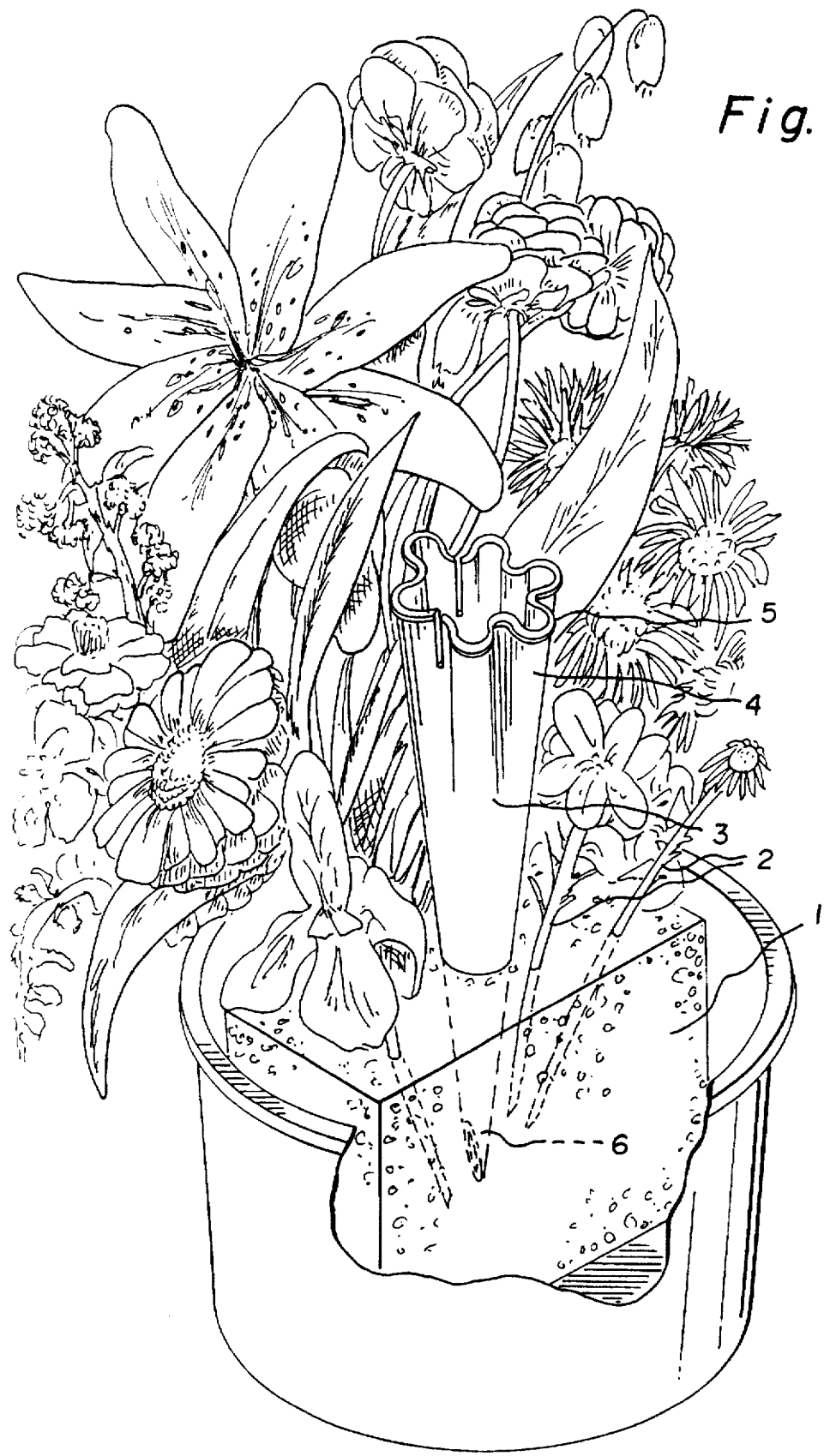
FIG. 3 is a perspective view of the embodiment of FIG. 1 in use.

The invention is a standardized size, plastic funnel 3 insertable into the foam brick 1 and easily loadable with a set amount of water. The sizes are standardized for set size baskets or other containers, and hold ½, 1, or 1½ cups of water. Typical dimensions would be lengths in a range of from 6 to 10 inches and widths or diameters at the upper end of the funnel in a range of from 1 to 3 inches. Alternatively, the funnel can be made having the desired length with the diameter being determined by the desired amount of water to be held for the particular size of block of foam.

The lower end 6 of the funnel is cut on a diagonal for easier insertion into the foam and to permit an opening that can not be blocked should the lower end be mistakenly pushed all of the way through the foam by mistake. The diagonal is at an acute angle to the central axis of the funnel. Typically, the diameter of the lower end of the funnel is from ½ to ⅛ inch.

The upper half 4 of the funnel can be fluted or scalloped to help keep the funnel relatively rigid. The general plan is circular and symmetrical with the scallops being evenly spaced. In addition, flower stems 2 can be inserted as close as possible to the funnel 3 to help hide it. That is, the scalloped top can be considered in part to be for the aid of the floral designer to help hide the funnel with flowers. To add to the rigidity of the funnel, the upper lip 5 of the funnel is flanged radially outwardly to make the upper end more rigid.

The side walls are from 15 to 20 mils thick, preferably 17–18 mils. One material for construction is clear polypropylene. It is desirable that the polypropylene is at least substantially transparent whereby when the funnel is positioned in the midst of a floral arrangement, the funnel is substantially invisible. Alternatively, the material of construction can be nontransparent and suitably colored or plain. Other suitable plastic materials would be readily apparent to those skilled in the art of plastics manufacturing. Materials are to be chosen based upon cost and strength.

As an additional feature, at the top end, two of the scallops are slit to form slots 7, permitting a gift card to be inserted and held.

The funnel can be extrusion or injection molded as a single unit. Water is added by using a simple measuring cup pouring it into the top end.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What I claim is:

1. A device for watering flower arrangements of cut flowers inserted into a block of closed cell foam, said device comprising a funnel having a central axis, an upper half, an upper end and a lower end, said funnel being frusto-conically shaped from said upper end to said lower end, said lower end being cut at an acute angle to said central axis, wherein said upper end has a peripheral edge with a laterally extending flanged lip therearound, and said upper half is scalloped, generally circular in plan and symmetrically arranged around said central axis with the scallops being evenly spaced about a periphery of said funnel.

2. The device as claimed in claim 1, wherein said flanged lip is radially outwardly directed relative to said central axis.

3. The device as claimed in claim 1, wherein said funnel is made to hold a predetermined volume of water.

4. The device as claimed in claim 1, wherein said predetermined volume of water is in the range of from ½ to 1½ cups.

5. The device as claimed in claim 1, wherein said funnel has a length in a range of from 6 to 10 inches, an upper end diameter in a range of from 1 to 3 inches, and a lower end diameter in a range of from ½ to ⅛ inches.

6. The device as claimed in claim 1, wherein said funnel is entirely made of a substantially transparent plastic material, whereby when said funnel is positioned in the midst of a floral arrangement, said funnel is substantially invisible.

7. The device as claimed in claim 6, wherein said plastic material is polypropylene.

8. A device for watering flower arrangements of cut flowers inserted into a block of closed cell foam, said device comprising a conically shaped funnel having a central axis, an upper end and a lower end, said lower end being cut at an acute angle to said central axis, wherein said upper end has a pair of slits arranged in parallel with said central axis and spaced apart from each other such that a card can be inserted into and held by said slits.

9. The device as claimed in claim 8, wherein said funnel is entirely made of a substantially transparent plastic material, whereby when said funnel is positioned in the midst of a floral arrangement, said funnel is substantially invisible.

10. The device as claimed in claim 9, wherein said plastic material is polypropylene.

11. The device as claimed in claim 8, wherein said upper end has a flanged lip.

12. The device as claimed in claim 11, wherein said flanged lip is radially outwardly directed relative to said central axis.

13. The device as claimed in claim 11, wherein said funnel has an upper half, said upper half being scalloped, generally circular in plan and symmetrically arranged around said central axis with the scallops being evenly spaced about a periphery of said funnel.

14. The device as claimed in claim 13, wherein said funnel is entirely made of a substantially transparent plastic material, whereby when said funnel is positioned in the midst of a floral arrangement, said funnel is substantially invisible.

15. The device as claimed in claim 14, wherein said plastic material is polypropylene.

16. The device as claimed in claim 8, wherein said funnel is made to hold a predetermined volume of water.

17. The device as claimed in claim 16, wherein said predetermined volume of water is in the range of from ½ to 1½ cups.

18. The device as claimed in claim 8, wherein said funnel has a length in a range of from 6 to 10 inches, an upper end diameter in a range of from 1 to 3 inches, and a lower end diameter in a range of from ½ to ⅛ inches.

\* \* \* \* \*

UNITED STATES PATENT AND TRADEMARK OFFICE
CERTIFICATE OF CORRECTION

PATENT NO. : 5,794,672

DATED : August 18, 1998

INVENTOR(S) : Golberg

It is certified that error appears in the above-identified patent and that said Letters Patent is hereby corrected as shown below:

```
Title page,
Item [76], line 1, delete "Goldberg" insert therefor

-- Golberg --
```

Signed and Sealed this

Fifteenth Day of December, 1998

Attest:

BRUCE LEHMAN

Attesting Officer　　　　Commissioner of Patents and Trademarks